(12) United States Patent
Olcott

(10) Patent No.: X5292
(45) Date of Patent: Dec. 3, 1828

(54) FLAX & HEMP ,EXTRACTING VEGETABLE MATTER

(76) Inventor: Sands Olcott

(364 words)